United States Patent
Monchiero et al.

(10) Patent No.: US 8,398,102 B2
(45) Date of Patent: Mar. 19, 2013

(54) SUSPENSION ARM FOR A MOTOR VEHICLE WHEEL SUSPENSION AND METHOD FOR MANUFACTURING SAME

(75) Inventors: Piero Monchiero, Turin (IT); Stefano Lo Giudice, Carignano (IT)

(73) Assignee: Sistemi Sospensioni S.p.A. (IT)

( * ) Notice: Subject to any disclaimer, the term of this patent is extended or adjusted under 35 U.S.C. 154(b) by 56 days.

(21) Appl. No.: 13/147,950

(22) PCT Filed: Feb. 4, 2010

(86) PCT No.: PCT/IB2010/050513
§ 371 (c)(1),
(2), (4) Date: Aug. 4, 2011

(87) PCT Pub. No.: WO2010/089705
PCT Pub. Date: Aug. 12, 2010

(65) Prior Publication Data
US 2012/0038126 A1      Feb. 16, 2012

(30) Foreign Application Priority Data

Feb. 5, 2009 (IT) .............................. TO2009A0076

(51) Int. Cl.
*B60G 3/04* (2006.01)
*B60G 7/00* (2006.01)

(52) U.S. Cl. ... 280/124.134; 280/124.135; 280/124.125; 29/897.2

(58) Field of Classification Search ........... 280/124.134, 280/124.135, 124.125, 124.1; 29/897.2
See application file for complete search history.

(56) References Cited

U.S. PATENT DOCUMENTS

| | | | | |
|---|---|---|---|---|
| 5,607,117 A | * | 3/1997 | Svensson | 242/261 |
| 5,662,348 A | * | 9/1997 | Kusama et al. | 280/124.134 |
| 7,273,219 B2 | * | 9/2007 | Michel et al. | 280/124.134 |
| 7,575,244 B2 | * | 8/2009 | Howell et al. | 280/124.134 |

(Continued)

FOREIGN PATENT DOCUMENTS

| | | |
|---|---|---|
| EP | 0 794 075 A2 | 10/1997 |
| JP | 2004-262453 A | 9/2004 |

OTHER PUBLICATIONS

Jun. 22, 2010 International Search Report for PCT/IB2010/050513.

*Primary Examiner* — Joseph Rocca
*Assistant Examiner* — Darlene P Condra
(74) *Attorney, Agent, or Firm* — Bliss McGlynn, P.C.

(57) ABSTRACT

A swing arm for a suspension of a vehicle comprises a substantially transversely outer arm portion having a free end for mounting of a support for supporting a wheel of the vehicle and a substantially transversely inner arm portion with a first branch and second branch. The first branch is substantially aligned with the outer arm portion and has a free end for mounting of a first connector for connection to a body of the vehicle, and the second branch extends along an arched path towards a rear part of the vehicle and has a free end for mounting of a second connector for connection to the vehicle body. A single-sheet metal piece includes a main portion having an open section and at least one secondary portion arranged in an edge zone of the swing arm, having a closed section, and formed by at least one strip of the metal piece folded onto the main portion and firmly secured with a free edge of the strip to the main portion. A method for manufacturing the swing arm comprises steps of obtaining the main portion by stamping of the metal piece, folding the strip of the metal piece so as to obtain the secondary portion, and firmly securing the free edge of the strip to the main portion.

9 Claims, 3 Drawing Sheets

U.S. PATENT DOCUMENTS

| | | | |
|---|---|---|---|
| 7,703,783 B2 * | 4/2010 | Miyawaki | 280/124.134 |
| 8,251,386 B2 * | 8/2012 | Chiku et al. | 280/124.134 |
| 2009/0008891 A1 * | 1/2009 | Jang et al. | 280/124.134 |
| 2009/0295113 A1 * | 12/2009 | Inoue et al. | 280/124.134 |
| 2010/0084834 A1 * | 4/2010 | Ersoy et al. | 280/124.1 |
| 2011/0127743 A1 * | 6/2011 | Musha | 280/124.1 |
| 2011/0272911 A1 * | 11/2011 | Gerhards et al. | 280/124.134 |
| 2012/0153592 A1 * | 6/2012 | Mielke et al. | 280/124.134 |

* cited by examiner

SUSPENSION ARM FOR A MOTOR VEHICLE WHEEL SUSPENSION AND METHOD FOR MANUFACTURING SAME

CROSS-REFERENCE TO RELATED APPLICATIONS

This application claims benefit of PCT Patent Application PCT/IB2010/050513 entitled "Suspension Arm for a Motor Vehicle Wheel Suspension" and filed on Feb. 4, 2010, which claims benefit of Italian Patent Application TO2009A000076 filed on Feb. 5, 2009.

BACKGROUND OF INVENTION

1. Field of Invention

The invention relates, generally, to a swing arm for a vehicle suspension and, in particular, to a swing arm for a vehicle front suspension as well as a method for manufacturing such an arm.

2. Description of Related Art

A swing arm of the above-indicated type is known from European Patent EP0794075B1. According to this known solution, the swing arm is obtained by stamping from a single sheet metal piece including a main portion which has an open section and secondary portions which have a closed section and are arranged along edge zones of the arm. The swing arm known from the aforesaid patent is manufactured by folding of the edge zones of the arm substantially along the whole perimeter of the same, with the exception of the zone of mounting of the wheel and of the zone of connection to the vehicle body, as well as of the zone of bifurcation of the transversely inner arm portion, which causes an increase in the cost of the arm, in addition to an increase in the weight of the arm with respect to an open-section stamped arm.

It is therefore an object of the invention to provide a swing arm for a vehicle suspension which makes it possible to reach a good compromise between the need for reducing the manufacturing costs and the weight of the arm and the need for ensuring a high stiffness of the arm.

SUMMARY OF INVENTION

The invention overcomes the disadvantages in the related art in a swing arm for a suspension of a vehicle. The swing arm comprises a substantially transversely outer arm portion having a free end for mounting of a support for supporting a wheel of the vehicle and a substantially transversely inner arm portion with a first branch and second branch. The first branch is substantially aligned with the outer arm portion and has a free end for mounting of a first connector for connection to a body of the vehicle, and the second branch extends along an arched path towards a rear part of the vehicle and has a free end for mounting of a second connector for connection to the vehicle body. A single-sheet metal piece includes a main portion having an open section and at least one secondary portion arranged in an edge zone of the swing arm, having a closed section, and formed by at least one strip of the metal piece folded onto the main portion and firmly secured with a free edge of the strip to the main portion.

The invention overcomes the disadvantages in the related art also in a method for manufacturing the swing arm. The method comprises steps of obtaining the main portion by stamping of the metal piece, folding the strip of the metal piece so as to obtain the secondary portion, and firmly securing the free edge of the strip to the main portion.

The invention is based on the idea of providing a swing arm for a vehicle suspension, in particular for a front suspension, in which at least one secondary arm portion having a closed section is obtained by folding and firmly securing, such as by welding, a strip of sheet metal to the remaining main arm portion having an open section. A reinforcement is thus obtained which is located in the zone(s) of the arm where it is necessary to increase the stiffness and the mechanical strength, thereby minimizing the overall cost and weight of the arm.

In an embodiment, the secondary portion having a closed section is located along a length of the edge of the arm extending close to a through hole provided in a central zone of the arm. The secondary portion having a closed section can, however, be located in any other point of the edge of the arm. Moreover, many secondary portions having a closed section may be provided.

In an embodiment, the outline of the cross-section of the main portion having an open section comprises a pair of horizontal straight lengths at the opposite ends of the section, a pair of vertical straight lengths extending from the opposite ends of the two horizontal straight lengths, and a U-shaped middle length which extends between the two horizontal straight lengths and includes a bottom and a pair of vertical sides. The free edge of the folded strip of sheet metal is firmly secured to either of the vertical sides of the U-shaped middle length of the main arm portion.

Other objects, features, and advantages of the invention will be readily appreciated as the invention becomes better understood while reading the subsequent detailed description of the invention taken in conjunction with the accompanying drawing thereof.

BRIEF DESCRIPTION OF EACH FIGURE OF DRAWING OF INVENTION

DETAILED DESCRIPTION OF EMBODIMENTS OF INVENTION

In the following description and claims, terms such as "longitudinal" and "transverse," "inner" and "outer," and "front" and "rear" are referred to the mounted condition of the swing arm on the vehicle—in particular, to the mounted condition of the swing arm as a component of the front suspension of the vehicle.

Figure 1:
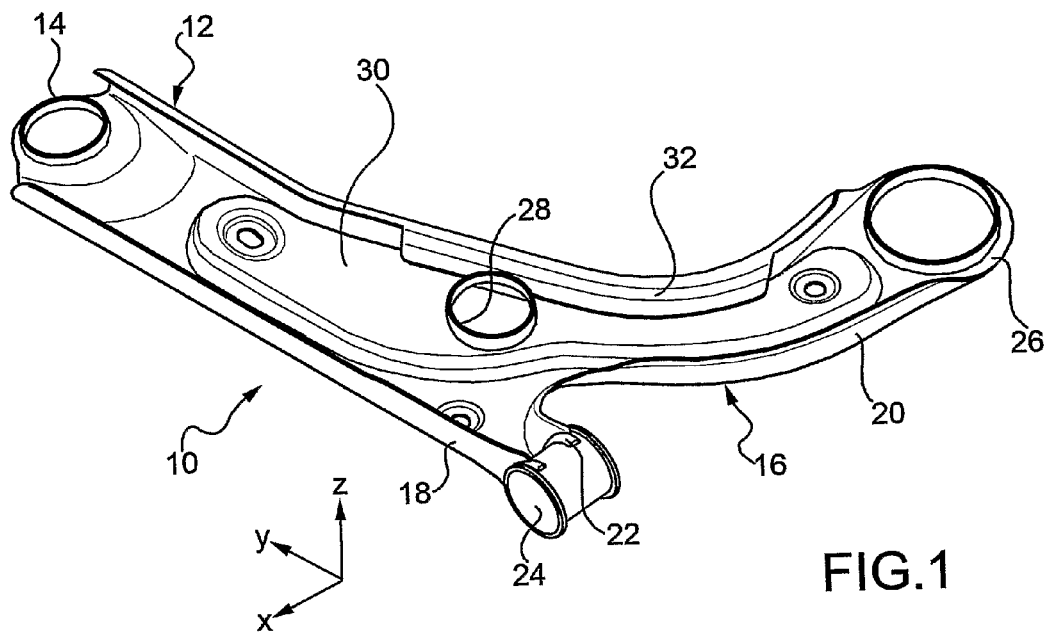
FIGS. 1 and 2 are perspective views from below and from above, respectively, of a swing arm for a vehicle suspension—in particular, for a front suspension—according to an embodiment of the invention.
Figure 2:
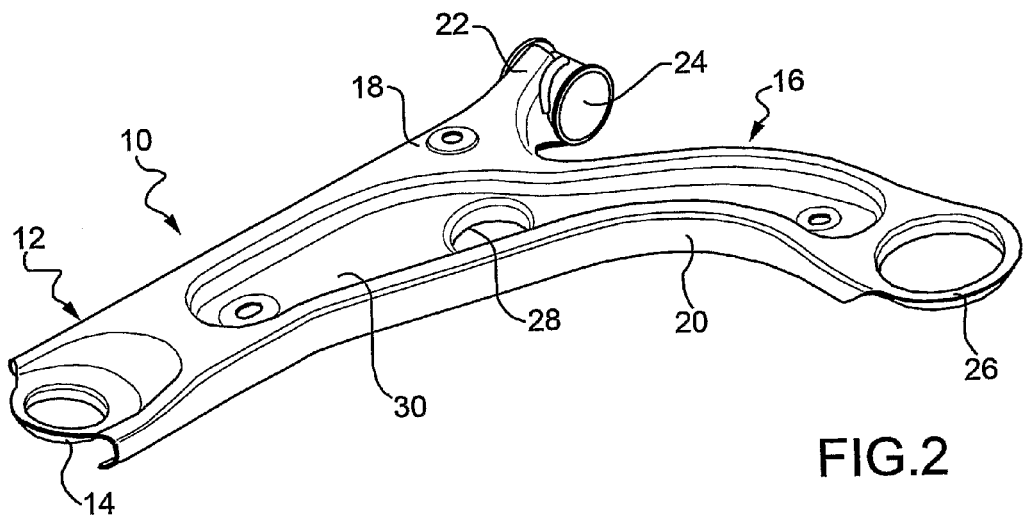

With reference first to FIGS. 1 and 2, a swing arm according to an embodiment of the invention is generally indicated 10 and integrally forms a transversely outer arm portion 12 extending substantially in the transverse direction of the vehicle (direction "y" of the "x-y-z" reference system indicated in FIG. 1) and having a free end 14 for mounting of a support (not illustrated) for supporting a vehicle wheel and a transversely inner arm portion 16 with a first branch 18 and second branch 20 bifurcating from the transversely outer arm portion 12. The first branch 18 is substantially aligned (transverse direction "y") with the transversely outer arm portion 12 and has a free end 22 for mounting of a first connector for connection to the vehicle body, the connector being formed in the present case by a bush 24 with horizontal axis. The second branch 20 extends along an arched path towards the rear part of the vehicle and has a free end 26 for mounting of a second connector for connection to the vehicle body (not illustrated). A through-hole 28 is provided in a central zone of the swing arm 10.

The swing arm 10 includes a single sheet metal piece which is obtained by stamping and includes a main portion 30 having an open section and at least one (exactly one in the embodiment illustrated in the drawing) secondary portion 32 having a closed section. The secondary portion is located in an edge zone of the swing arm 10.

Figure 3:
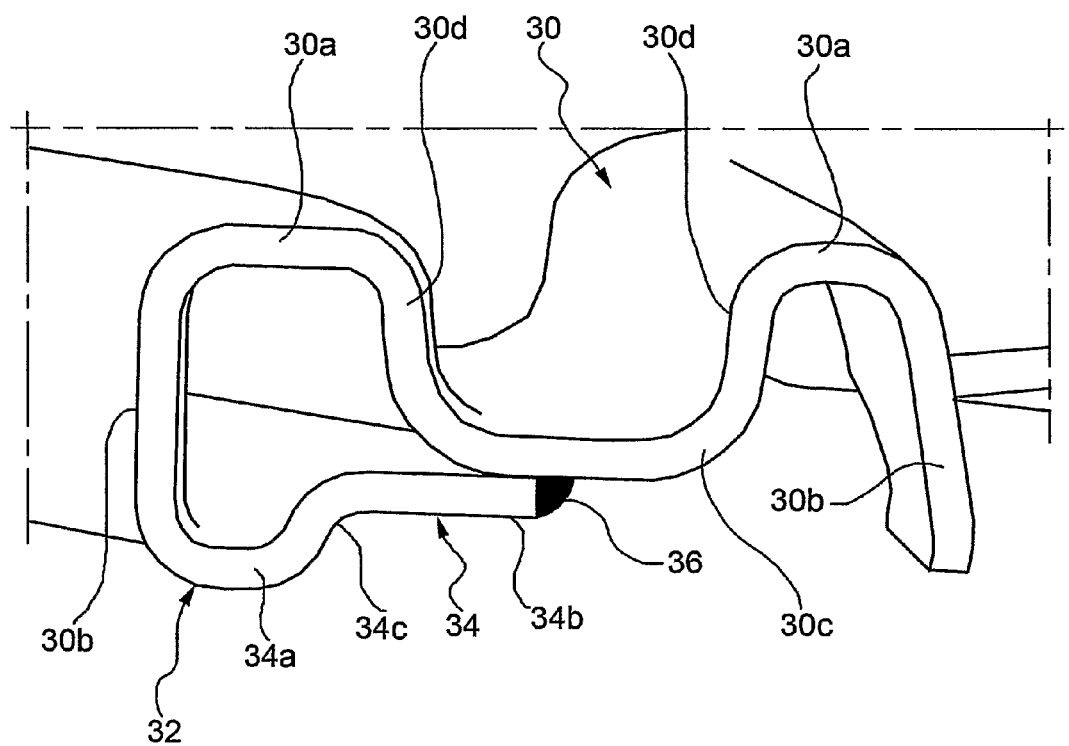
FIG. 3 is a perspective view on an enlarged scale which shows a detail of the swing arm of FIGS. 1 and 2, sectioned through a vertical plane at an edge zone of the arm having a closed section.
Figure 4:
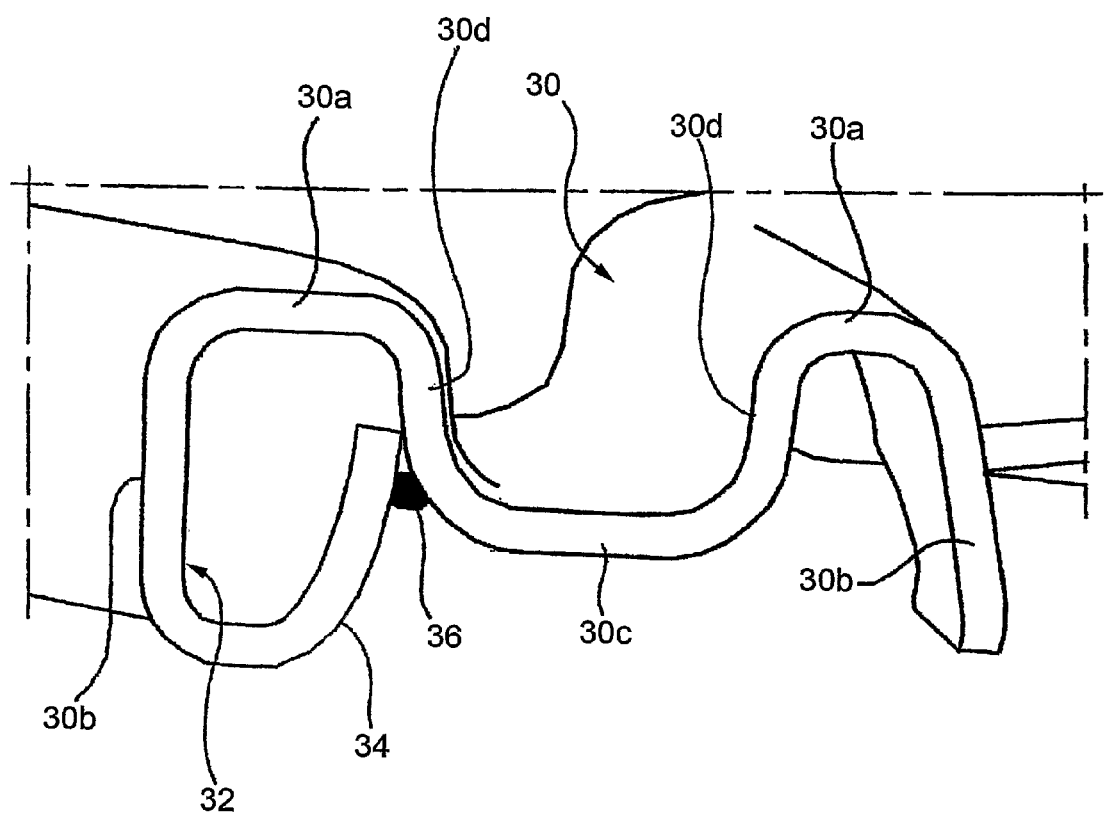
FIG. 4 is a perspective view on an enlarged scale similar to that of FIG. 3 and relating to a further embodiment of the invention.

The outline of the open-section main portion 30 of the swing arm 10 is suitably shaped to provide the swing arm 10 with a sufficient stiffness—in particular, under bending. For instance, in both the embodiments shown in FIGS. 3 and 4, the outline of the open-section main portion 30 of the swing arm 10 comprises a pair of horizontal straight lengths 30a at the opposite ends of the section, a pair of vertical (or approximately vertical) straight lengths 30b extending downwards (relative to the observer of the above-mentioned figures) from the opposite ends of the two horizontal straight lengths 30a, and a U-shaped middle length which extends between the two horizontal straight lengths 30a and includes a bottom 30c and a pair of vertical (or approximately vertical) sides 30d.

The closed-section secondary portion 32 of the swing arm 10, which in the drawing is the edge zone of the second branch 20 of the transversely inner arm portion 16 located close to the hole 28, has the function of providing the arm with the required mechanical properties in terms of fatigue life, stiffness, and resistance to deformation in case of impact. The closed-section secondary portion 32 is obtained by folding of a strip 34 of the single sheet metal piece which extends from the free edge of a vertical straight length 30b of the open-section main portion 30. The strip 34 may be a simple flat (or approximately flat) strip or, as in the embodiment illustrated in FIG. 3, have two flat (or approximately flat) portions 34a, 34b joined by a substantially S-shaped curved portion 34c. The strip 34 is firmly secured to the open-section main portion 30—for instance, by a welding bead 36 between the free edge of the strip 34 and the bottom 30c of the U-shaped middle length of the main portion 30—so as to ensure a continuity of material between the strip and the main portion and to achieve the inertial characteristics of a closed section. According to the embodiment of FIG. 4, the strip 34 is folded, such as with an arched path, in such a manner that the free edge thereof insists against either of the vertical sides 30d of the U-shaped middle length of the main portion 30 and is firmly secured thereto—for instance, by a welding bead 36.

Naturally, the closed-section secondary portion may be located in any other zone of the arm depending on the required characteristics. In any case, the closed-section secondary portion does not extend along the whole perimeter of the arm or along the largest part of the perimeter of the arm (as in the known swing arm), but only along a restricted portion thereof, whereby the increase in cost and weight with respect to a traditional arm having an open section is minimized. Many secondary portions having a closed section of the type of the one described above may also be provided, these portions extending only along a minimum part of the perimeter of the arm.

The material used for producing the swing arm according to the invention can be a high-strength steel, i.e., a steel having a high-yield strength, but it is also possible to use other materials particularly suitable for cold-stamping or hot-stamping followed by hardening and tempering. For example, the following materials can be used: low-alloy steels, boron steels, and vanadium steels.

A method for manufacturing the swing arm according to the invention comprises steps of:
 obtaining by stamping of a single piece of sheet metal an arm with an open section integrally forming a transversely outer arm portion and transversely inner arm portion having a first branch and second branch bifurcating from the transversely outer arm portion;
 folding or bending at least one strip of sheet metal of the arm so as to obtain a closed section located in an edge zone of the arm; and
 securing—for instance, by welding—the free edge of the strip (or strips) of sheet metal of the arm to the remaining open-section part of the arm.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as specifically described above.

The invention claimed is:

1. A swing arm (10) for a suspension of a vehicle, said swing arm (10) comprising:
 a single-sheet metal piece including a main portion (30);
 a substantially transversely outer arm portion (12) having a free end (14) for mounting of a support for supporting a wheel of the vehicle; and
 a substantially transversely inner arm portion (16) with a first branch (18) and second branch (20), said first branch (18) being substantially aligned with said outer arm portion (12) and having a free end (22) for mounting of a first connector (24) for connection to a body of the vehicle and said second branch (20) extending along an arched path towards a rear part of the vehicle and having a free end (26) for mounting of a second connector for connection to the vehicle body;
 said main portion (30) having an open section and at least one secondary portion (32) arranged in an edge zone of said swing arm (10), having a closed section, and formed by at least one strip (34) of said metal piece folded onto said main portion (30) and firmly secured with a free edge of said at least one strip (34) to said main portion (30).

2. A swing arm (10) as set forth in claim 1, wherein said at least one strip (34) is welded to said main portion (30).

3. A swing arm (10) as set forth in claim 1, wherein said at least one secondary portion (32) is located in an outer edge zone of said second branch (20) of said inner arm portion (16) near a through-hole (28) provided in a substantially central zone of said swing arm (10).

4. A swing arm (10) as set forth in claim 1, wherein an outline of a cross-section of said main portion (30) includes a pair of substantially horizontal straight lengths (30a) at opposite ends of said cross-section, a pair of substantially vertical straight lengths (30b) extending from opposite ends of said horizontal straight lengths (30a), and a substantially U-shaped middle length extending between said horizontal straight lengths (30a) and including a bottom (30c) and a pair of vertical sides (30d).

5. A swing arm (10) as set forth in claim 4, wherein said free edge of said at least one strip (34) is firmly secured to either of said vertical sides (30d) of said U-shaped middle length of said main portion (30).

6. A swing arm (10) as set forth in claim 4, wherein said free edge of said at least one strip (34) is firmly secured to said bottom (30c) of said U-shaped middle length of said main portion (30).

7. A swing arm (10) as set forth in claim 1, wherein said swing arm (10) includes any of low-alloy steel, boron steel, and vanadium steel.

8. A method for manufacturing a swing arm (10) for a suspension of a vehicle, wherein said swing arm (10) comprises a single-sheet metal piece including a main portion, a substantially transversely outer arm portion (12) having a free end (14) for mounting of a support for supporting a wheel of the vehicle, a substantially transversely inner arm portion (16) with a first branch (18) and second branch (20), said first branch (18) being substantially aligned with said outer arm portion (12) and having a free end (22) for mounting of a first connector (24) for connection to a body of the vehicle and said second branch (20) extending along an arched path towards a rear part of the vehicle and having a free end (26) for mounting of a second connector for connection to the vehicle body, and said main portion (30) having an open section and at least one secondary portion (32) located in an edge zone of said swing arm (10) and having a closed section, said method comprising the steps of:
   a) obtaining said main portion (30) by stamping of said metal piece;
   b) folding at least one strip (34) of said metal piece so as to obtain said at least one secondary portion (32); and
   c) firmly securing a free edge of said at least one strip (34) to said main portion (30).

9. A method for manufacturing a swing arm as set forth in claim 8, wherein said free edge of said at least one strip (34) is welded to said main portion (30).

* * * * *